US008889056B2

(12) United States Patent
Gazzara et al.

(10) Patent No.: US 8,889,056 B2
(45) Date of Patent: Nov. 18, 2014

(54) SPORTS RACQUET WITH STRING PORT HOLES

(75) Inventors: Roberto Gazzara, Mestre (IT); Mauro Pinaffo, Camposampiero (IT); Michele Pozzobon, Fossalunga di Vedelago (IT); Mauro Pezzato, Treviso (IT)

(73) Assignee: Prince Sports, LLC., New York, NY (US)

( * ) Notice: Subject to any disclaimer, the term of this patent is extended or adjusted under 35 U.S.C. 154(b) by 358 days.

(21) Appl. No.: 13/090,512

(22) Filed: Apr. 20, 2011

(65) Prior Publication Data
US 2011/0195807 A1 Aug. 11, 2011

Related U.S. Application Data

(62) Division of application No. 11/584,200, filed on Oct. 20, 2006, now Pat. No. 7,935,286.

(30) Foreign Application Priority Data

Dec. 14, 2005 (EP) .................................. 05112160

(51) Int. Cl.
| | |
|---|---|
| *A63B 49/10* | (2006.01) |
| *A63B 51/00* | (2006.01) |
| *B29C 70/54* | (2006.01) |
| *B29C 33/00* | (2006.01) |
| *B29C 70/44* | (2006.01) |
| *A63B 59/00* | (2006.01) |
| *A63B 51/10* | (2006.01) |
| *A63B 49/00* | (2006.01) |
| *B29L 31/52* | (2006.01) |

(52) U.S. Cl.
CPC ............ *A63B 49/002* (2013.01); *A63B 59/0092* (2013.01); *A63B 2049/103* (2013.01); *A63B 51/10* (2013.01); *A63B 51/00* (2013.01); *A63B 49/007* (2013.01); *A63B 49/106* (2013.01); *B29C 70/545* (2013.01); *B29C 33/0033* (2013.01); *B29L 2031/5245* (2013.01); *B29C 70/446* (2013.01); *A63B 2209/023* (2013.01)
USPC ........... 264/516; 264/154; 264/257; 264/258; 264/267; 264/512; 264/314

(58) Field of Classification Search
CPC ........... A63B 2049/103; A63B 49/002; A63B 49/06; A63B 49/007
USPC .......... 264/516, 267, 257–258, 314, 512, 154
See application file for complete search history.

(56) References Cited

U.S. PATENT DOCUMENTS

| 4,183,776 A | 1/1980 | Staub et al. |
| 5,234,657 A * | 8/1993 | Hong ............................. 264/516 |

(Continued)

FOREIGN PATENT DOCUMENTS

| DE | 3922701 | 1/1991 |
| DE | 19854737 | 9/1999 |

(Continued)

OTHER PUBLICATIONS

European Search Report dated Jun. 19, 2006 for Application No. EP 05 11 2160.

*Primary Examiner* — Amjad Abraham
(74) *Attorney, Agent, or Firm* — R. Blake Johnston; DLA Piper LLP (US)

(57) ABSTRACT

A sports racquet having a plurality of string port holes and conventional string holes is formed of a single tube of prepreg material. When molded, mold elements press opposed portions of the prepreg tube into contact with one another, and shape the adjoining prepreg material into a string port hole blanks. The portion of the pressed-together material which initially blocks the string port hole is removed after molding so that the string port holes extend through the frame. Alternatively, the mold elements cause the prepreg tube to follow a serpentine shape, thereby defining string port holes which are open alternately along the top and bottom surface of the frame. A pair of cover rings may be secured to the top and bottom racquet surfaces to cover the open sides of the string port holes.

7 Claims, 7 Drawing Sheets

(56) References Cited

U.S. PATENT DOCUMENTS 5,464,210 A * 11/1995 Davis et al. .................. 473/537
2005/0153799 A1 7/2005 Rigoli
2005/0266940 A1 12/2005 Filippini

FOREIGN PATENT DOCUMENTS

| JP | 6319833 | 11/1993 |
| WO | WO 9426361 | 11/1994 |
| WO | WO 2004/075996 | 9/2004 |

* cited by examiner

SPORTS RACQUET WITH STRING PORT HOLES

CROSS-REFERENCE TO RELATED APPLICATIONS

The present invention is a divisional of U.S. patent application Ser. No. 11/584,200, filed Oct. 20, 2006, which will issue as U.S. Pat. No. 7,935,286 on May 3, 2011.

BACKGROUND OF THE INVENTION

The present invention relates to sports racquets, for example tennis, squash, badminton, and racquetball racquets. Such racquets have a head portion containing an interwoven string bed, a handle, and a shaft portion connecting the head portion to the handle.

In conventional racquets, holes for anchoring the ends of the strings are formed in the frame by drilling small string holes in the frame after the racquet is molded. Generally, each string hole accommodates a single string. Plastic grommet pegs, which are formed on grommet and bumper strips that extend along the outside surface of the frame, extend through the string holes to protect the strings from the sharp edges of the drilled holes.

Co-owned PCT application WO 2004/075996 discloses a sports racquet in which some adjacent pairs of small string holes along the sides, tip, and throat bridge of the racquet are replaced by enlarged string holes having two inwardly facing string bearing surfaces which are spaced apart by a distance corresponding to the distance between two contiguous main strings or cross strings (referred to herein as "string ports holes"). Preferably the frame is formed of a double tube of carbon fiber-reinforced composite material (a so-called graphite frame), in which the string port holes are molded into as the racquet as the racquet is pressure molded. As a result of using two tubes, each forming one-half of the enlarged string hole, the string holes can have rounded edges and do not require the use of grommet pegs or strips. Also, in the regions between string holes, the adjoining walls of the two tubes are fused together to form a stiffening wall inside the frame. The result is a racquet which has improved torsional stiffness and lighter weight.

The racquet is made in a mold having a mold cavity in the desired shape of the frame. The mold has two halves. A prepreg tube containing an inflatable bladder is placed in each mold half. A plurality of mold insert members, having an outside surface in the desired shape of the string port holes, as well as a plurality of pins to form conventional string holes, are positioned between the two prepreg tubes and the mold is closed. The bladders are then inflated while the mold is heated to cure the composite resin. After removing the racquet frame from the mold, the mold insert members and pins are removed leaving string port holes and conventional string holes, respectively.

It is possible to form a racquet with string port holes using a single frame tube. For example, the racquet frame can be molded from a single prepreg tube, with the holes being drilled after molding. However, drilling string holes, and particularly large string holes such as string port holes, weakens the frame. Alternatively, it is possible to construct the frame by molding two frame halves separately, and then joining the two halves, e.g., by gluing, welding, fusing, or electro-fusing. However, it would be desirable to employ improved methods of forming a racquet frame having port string holes and which is formed from a single frame tube.

BRIEF SUMMARY OF THE INVENTION

A racquet frame according to the invention is made using a prepreg tube containing an inflatable bladder therein. The prepreg tube is placed inside a mold which, when closed, forms a mold cavity in the desired shape of the frame.

In one embodiment, the mold cavity contains a plurality of mold members. Each mold member has a first surface to press portions of opposite sides of the prepreg tube into contact with one another, and a second surface in the shape of the sidewall of a string port hole. The second surface is oriented so that a string port hole is formed in the string bed plane in the direction of either main strings or cross strings, depending on its location. The mold members may be an integral part of the mold or may be separate pieces that are placed inside the mold cavity.

After the mold is closed, the bladder is pressurized so that the prepreg tube conforms to the shape of the mold as well as the second surface. Thus, the mold member forms string port holes blanks which are blocked by the pressed-together portions of said prepreg tube. At the same time, the mold is heated such that said prepreg tube cures.

Thereafter, the pressed-together portions blocking the string port holes are removed so that the string port holes extend through the racquet frame. The portions of the pressed-together portions lying radially outwards of the string port holes form a part of the sidewall of the string port holes after the center sections are removed.

Preferably, the string port holes are molded so that the entrances are rounded. If desired, grommet members may be inserted in the string port holes, or the entrances may be shaped to seat O-rings, or the holes may be used without grommet members or O-rings.

In another embodiment, the mold members extend completely across a portion of the mold cavity, alternately from the upper or lower mold cavity wall. When the bladder is pressurized, the mold members shape the prepreg tube in a serpentine fashion, forming a plurality of string port holes which are open in a direction perpendicular to said string bed plane alternately in an upward and downward direction.

If desired, the upper and lower surfaces of the head portion of the frame may each be covered by a cover ring, which closes the open sides of the string port holes. The cover rings are secured to the frame by any suitable means, such as gluing, welding, co-curing, fusion, or electro-fusion.

The string port holes can have any suitable shape, such as elliptical, circular, polygonal, rounded, convex, concave, or irregular. The use of enlarged string holes allows the overall weight of the racquet to be reduced and makes stringing easier. They also improve the performance of the racquet, reduce production costs, vibration, and shock, and improve comfort.

Other features and advantages of the invention will become apparent from the following description of preferred embodiments, taken in conjunction with the drawings.

DETAILED DESCRIPTION OF THE INVENTION

Figure 1:
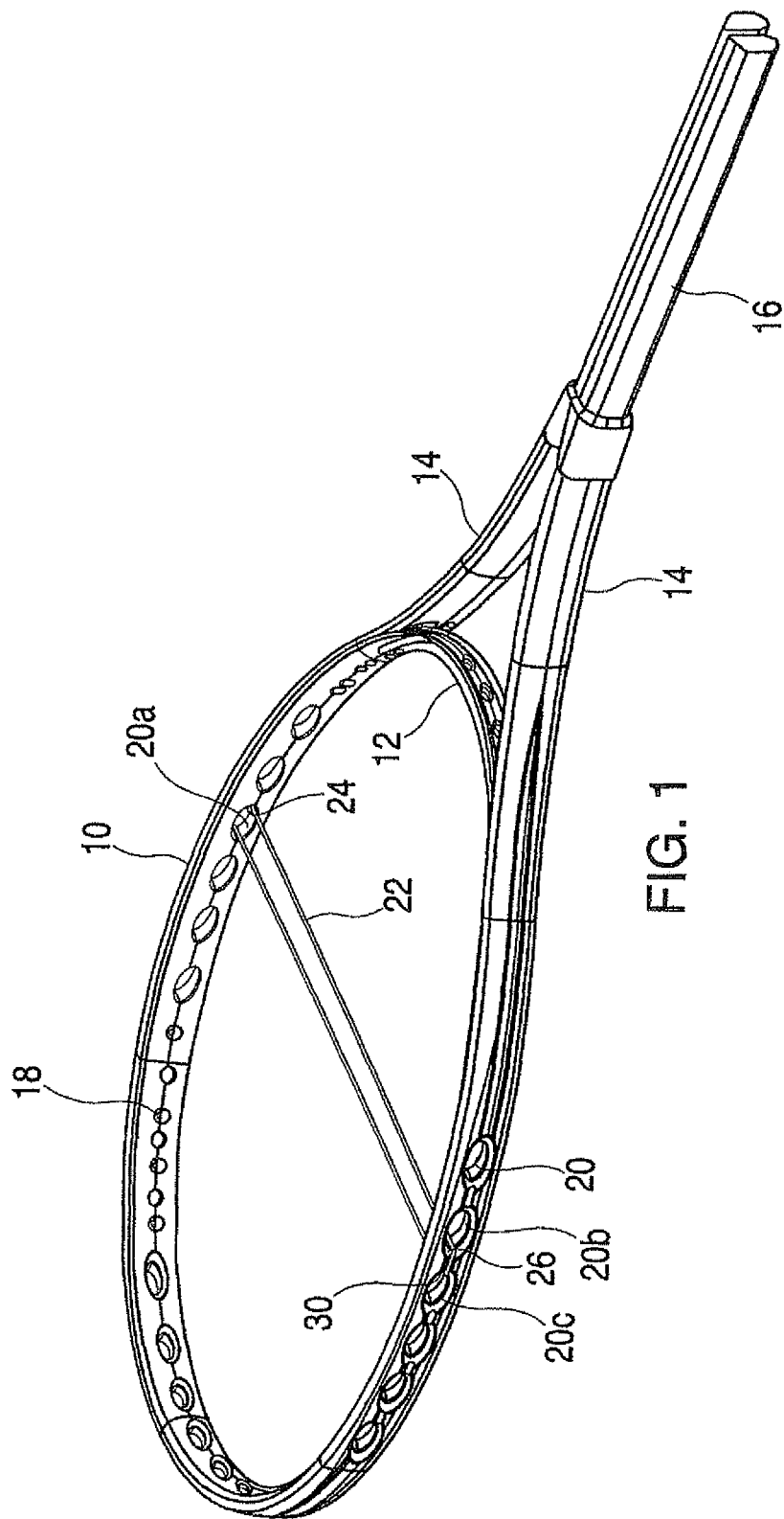
FIG. 1 is a perspective view of a sports racquet frame according to the invention.

Referring to FIG. 1, a tennis racquet frame includes a head portion 10 which includes a throat bridge 12, a pair of converging shafts 14, and a handle portion 16. The head portion 10 includes a plurality of conventional string holes 18 and a plurality of consecutive port string holes 20. A handle (not shown) is mounted on the handle portion 16, and thereafter the handle may be wrapped with a grip.

As described in greater detail in WO 2004/075996, which is incorporated herein by reference, string port holes on opposite sides of the head 10, as well as opposed port string holes in the tip and throat bridge 12, are offset relative to one another. In this manner, e.g., along the sides, a string segment 22 which bears against the lower bearing surface 24 of one port string hole 20a, after crossing the string bed, bears against the upper bearing surface 26 of the string port hole 20b, wraps around the outside surface of the head 10, and bears against the lower bearing surface 30 of the next adjacent port string hole 20c before again crossing the string bed. Such stringing is used both for the cross strings 22 and the interwoven main strings (not shown). The interwoven main and cross strings form a string bed lying substantially in a string bed plane.

In a conventional inflation molding process, a prepreg tube, formed of sheets of uncured carbon fiber-reinforced epoxy resin, and containing an inflatable bladder, is placed inside of a mold which, when closed, has a cavity shaped as a sports racquet frame. After closing the mold, the bladder is inflated, so that the prepreg tube assumes the shape of the mold, and the mold is heated so as to cure the epoxy. The frame is then removed and string holes are drilled.

Figure 2A:
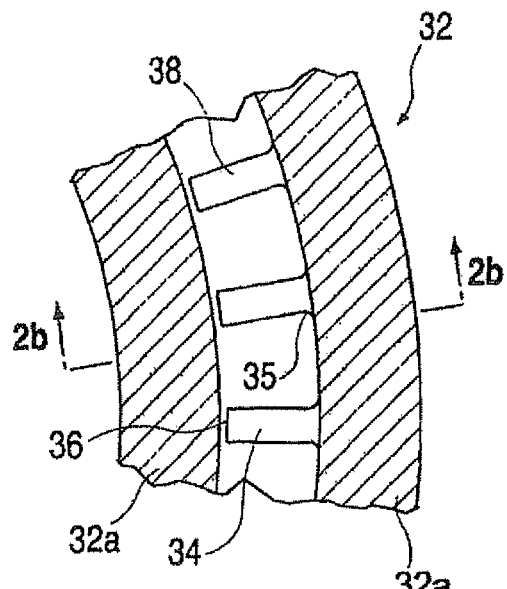
FIGS. 2a and 2b are top and cross-sectional schematic views of a portion of a mold which may be used to form the racquet frame of FIG. 1.
Figure 2B:
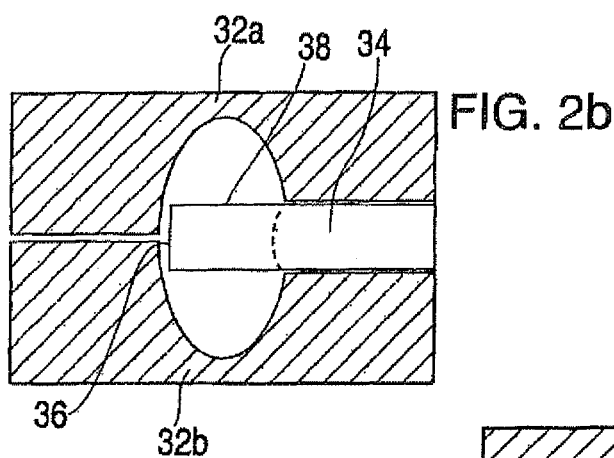

The present invention also uses a mold having a cavity in the shape of the racquet frame. However, as shown in FIGS. 2a and 2b, the mold 32, which includes mold halves 32a and 32b, includes a plurality of mold members 34. The mold members 34 have a first surface 36 that, when a prepreg tube is placed in the mold and the mold is closed, presses opposite sides of the tube together. The mold members 34 have a second surface 38 which is in the shape of a string port hole 20. As shown, preferably the mold members 34 have a curved base 35, at least in the direction where the strings enter and leave the holes.

Figure 2C:
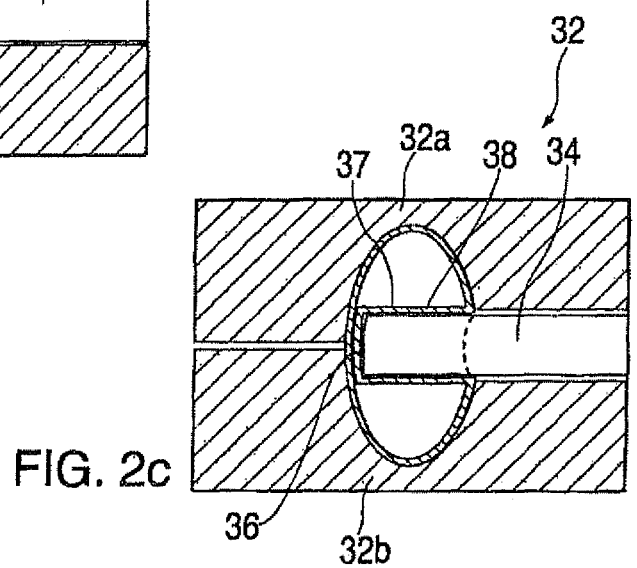
FIG. 2c shows the FIG. 2b mold with an inflated prepreg tube positioned inside.

The mold members 34 extend in the string bed plane in the direction of the strings. When the bladder of the prepreg tube is inflated and the material is cured, the opposed surfaces of the prepreg tube below surface 36 remain pressed together and fuse. The surrounding prepreg material 37, however, assumes the shape of the surface 38, as shown in FIG. 2c.

Figure 3:
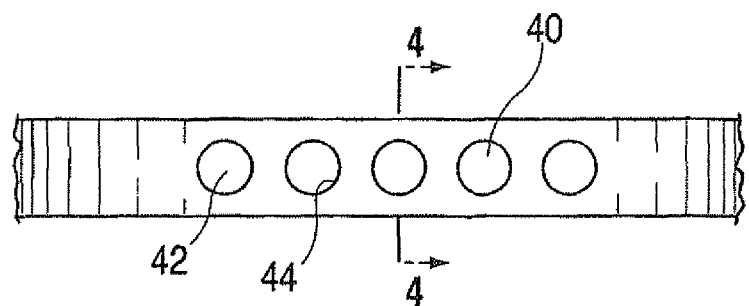
FIG. 3 is a front view of a section of a racquet frame after molding.
Figure 4:
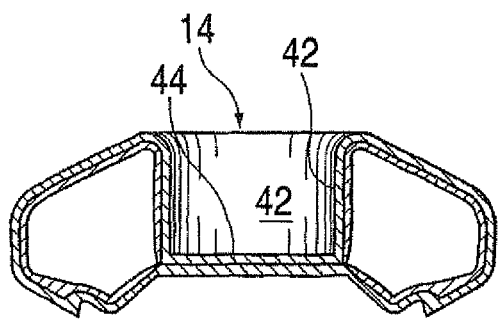
FIGS. 4 and 5 are enlarged sectional views, taken through lines 4-4 of FIG. 3, of the racquet frame after molding and after the string port hole is unblocked, respectively.
Figure 5:
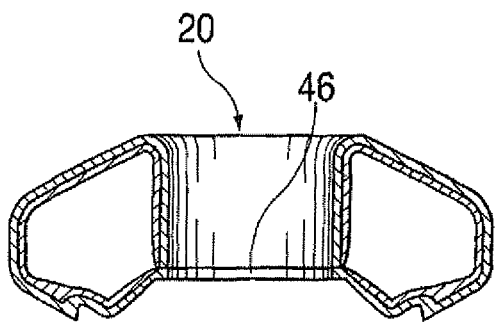

After curing, the frame is removed from the mold. As shown in FIGS. 3-4, the frame will have a plurality of string port hole blanks 40 consisting of the sidewall 42 and the pressed-together portions 44. As shown in FIG. 5, the portions of the pressed together portions 44 which block the string port hole are easily removed so that the string port holes 20 extend through the frame in the plane of the string bed. When the string port hole is opened up, the portion of the pressed together portions 44 lying radially outwards of the port string hole 20 form a wall 46 which becomes part of the sidewall 42 of the port string hole 20.

Although the port string hole is described as having a single sidewall 42, which is the case if the port string hole 20 has a round, oval, or otherwise curved cross sectional shape, the port string holes 20 may have other shapes such as rectangular in which case they have more than one sidewall. As used herein, however, the term "sidewall" refers to the wall, or the more than one wall, defining the opening of the string port holes 20.

Figure 6:
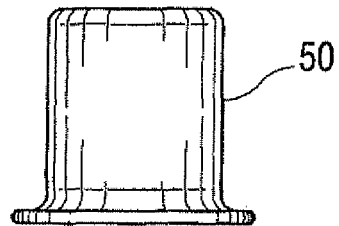
FIG. 6 is a side view of a grommet which may be used in the string port holes of the racquet of FIG. 1.

The entrances to the string port holes 20 can be molded to be rounded, e.g., due to the curved base 35 of the mold member 34, and thus do not require the use of bumper or grommet strips. However, as shown in FIG. 6, if desired grommet members 50 may be provided and inserted into the string port members 20 prior to stringing. The grommet members 50 may be selected to change the weight, balance, and moments of inertia (mass and polar) of the racquet. Conventional grommet or bumper strips are preferably used with the conventional string holes, since these are drilled and have sharp edges which could otherwise damage the strings.

Figure 7:
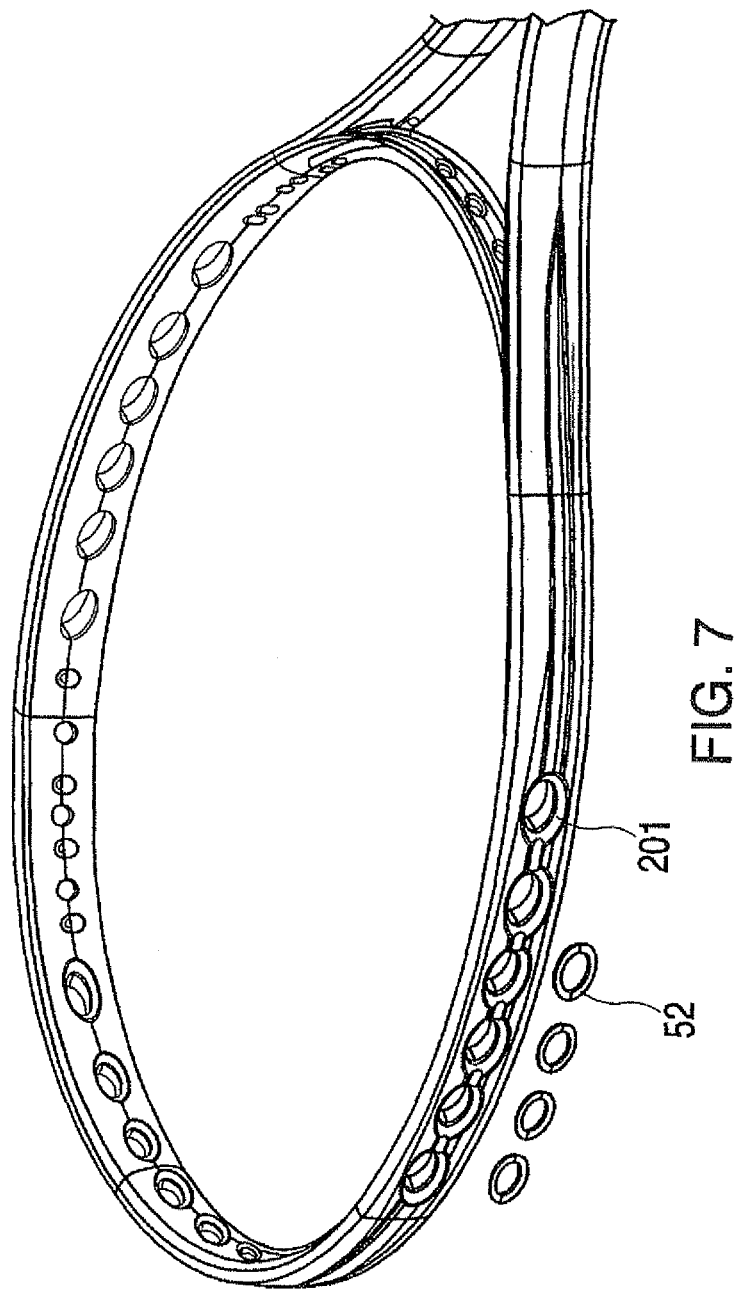
FIG. 7 is an exploded, perspective view of another embodiment of a racquet frame, in which O-rings are inserted in the string port holes.

Alternatively, as shown in FIG. 7, the string port holes 201 can be molded so that their entrances form a seat for O-rings.

Figure 8:
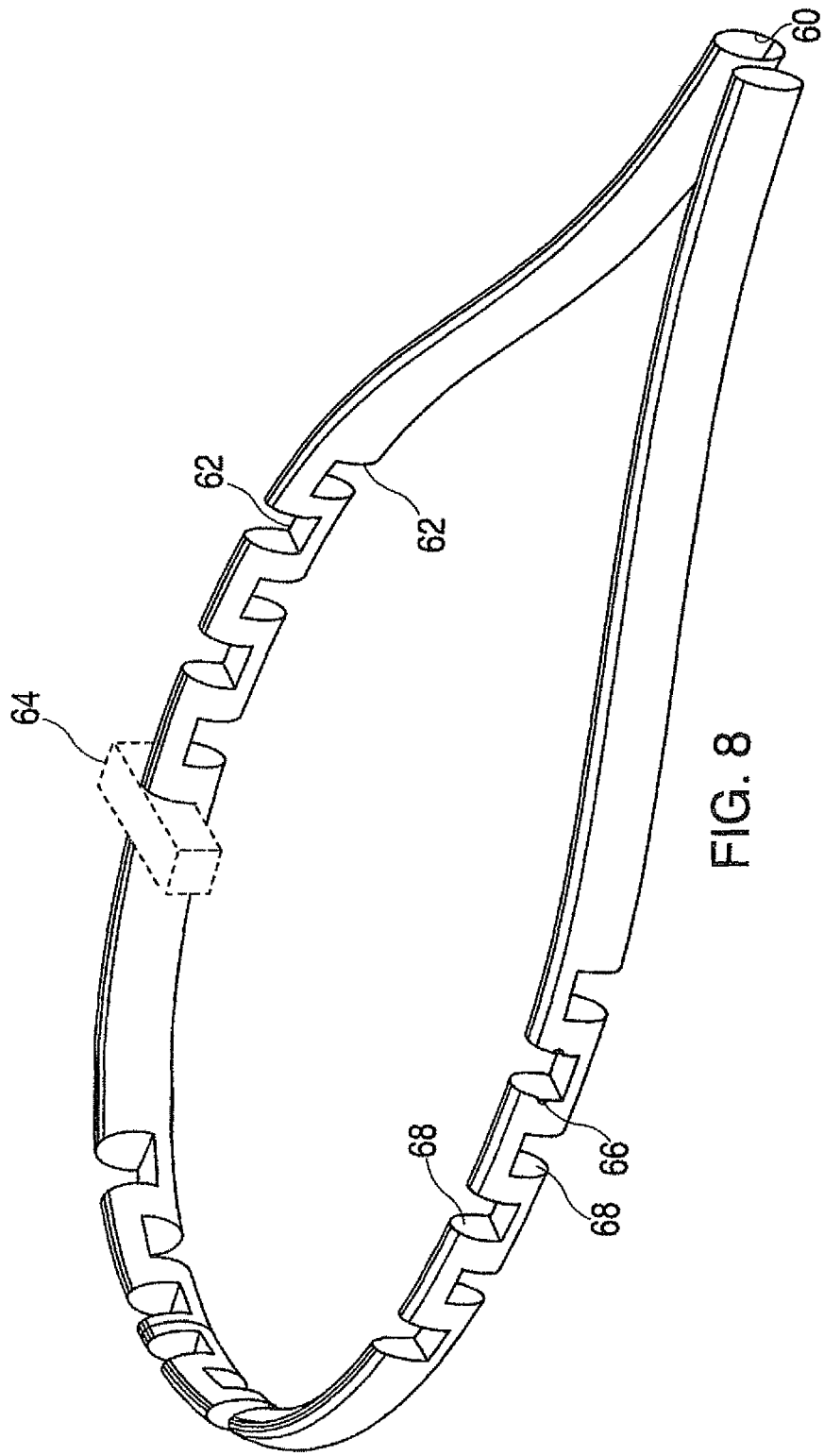
FIG. 8 is a perspective view of another embodiment of a racquet frame according to the invention.
Figure 9:
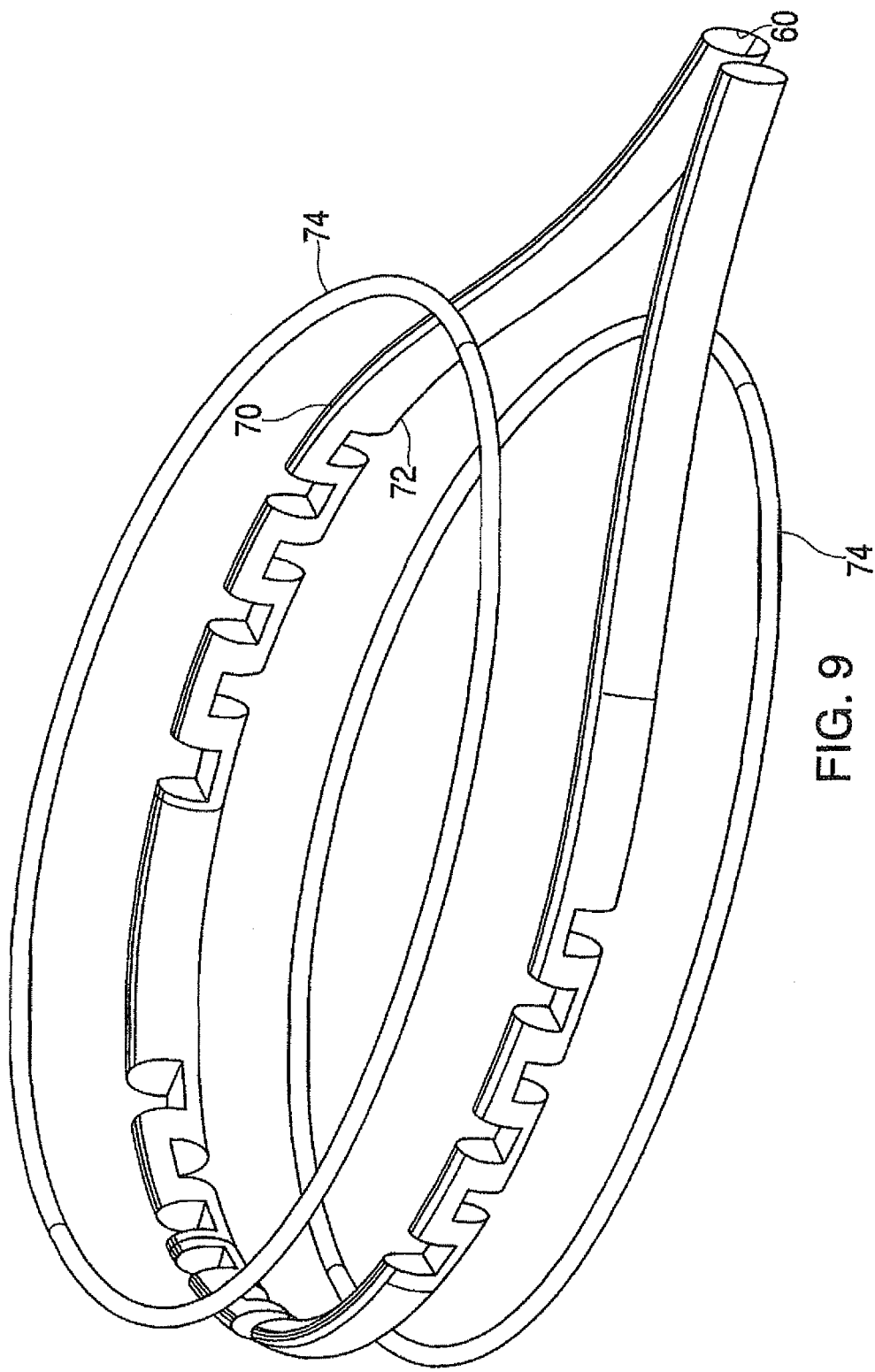
FIG. 9 is an exploded, perspective view of the frame of FIG. 8 and a pair of cover rings.
Figure 10:
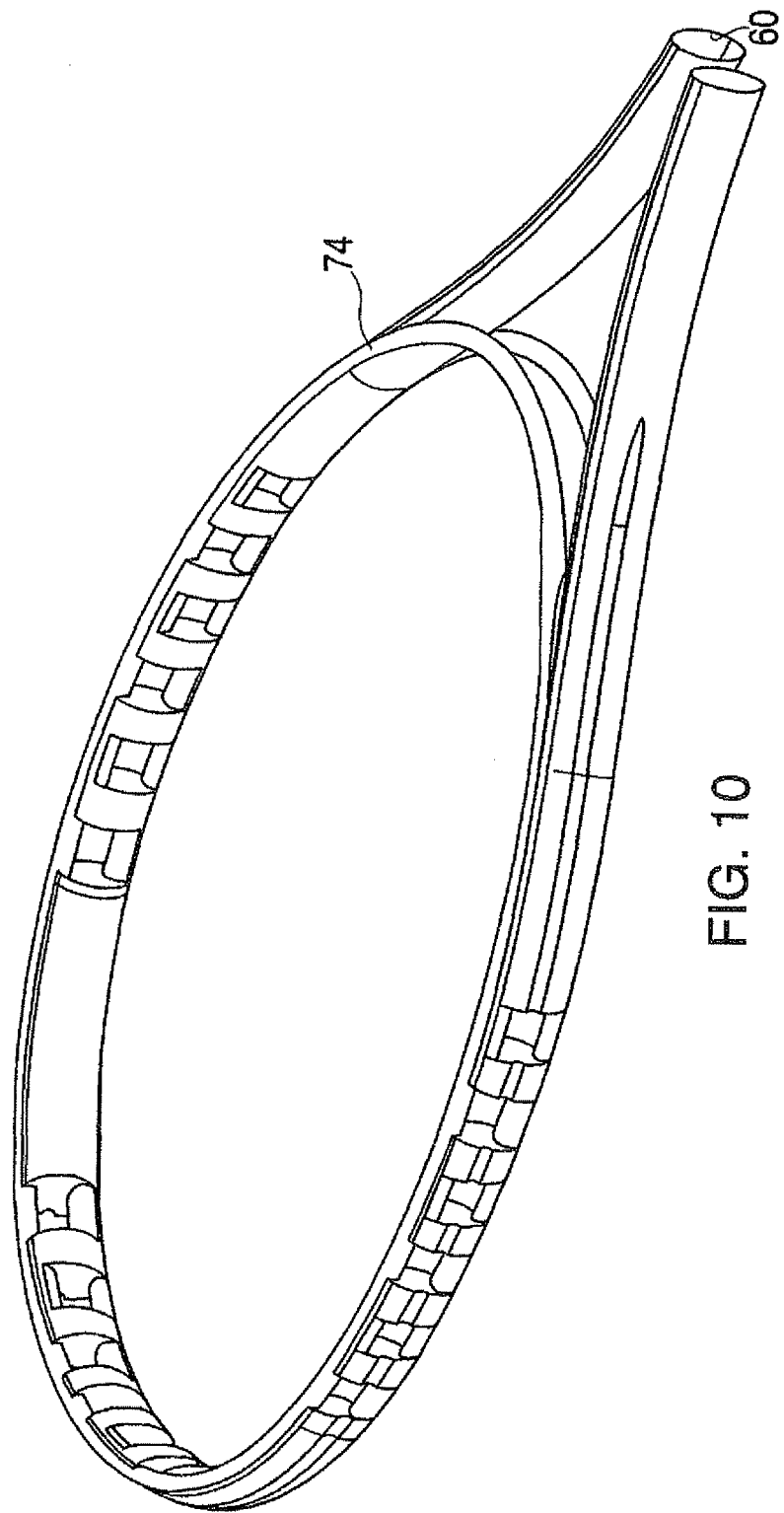
FIG. 10 is a perspective view of the racquet frame of FIG. 9 after the cover rings have been attached.

FIGS. 8-10 show another embodiment of the invention. As in the case of FIGS. 1-7, the racquet frame is formed a single, continuous tube 60 of prepreg material. The frame may also include a throat bridge (not shown). In the mold, the prepreg tube is molded into a serpentine shape forming a plurality of contiguous string port holes 62 which have an open side alternately facing up and down.

Such frame may be molded in a mold similar to the mold in FIGS. 2a-2b except that the mold members 34 are replaced by mold members, depicted schematically by element 64, which extend all the way across the mold cavity, in the direction of the strings, alternately from the upper and lower mold cavity wall.

Preferably, the entrance to the string port holes 62, i.e., where the strings enter and leave the holes on the outer surface of the frame, are molded to have a guide lip 66, to guide and secure the end of the string entering and leaving the string hole. Also, preferably the string contacting walls 68 of the string port holes 62 are flat and oriented parallel to the string direction and perpendicular to the string bed plane. This has two advantages. First, when a ball impacts the string bed, the string is constrained against movement, on opposite sides of the racquet, only by the guide lips 66. Because the strings are constrained only on the outer side of the racquet frame, their effective length is increased, providing more power. Second, after the ball has left the string bed, the strings will rub against the surfaces 68, which will damp string vibration, providing a more comfortable feel.

The racquet frame of FIG. 8 may be used with the open string port holes 62. Alternately, if desired the upper 70 and lower 72 surfaces of the head portion of the frame head portion may be covered by a pair of cover rings 74, as shown in FIGS. 9-10. The cover rings 74 may be of any desired material, such as aluminum, magnesium, titanium, carbon fiber tube, nano-material, or wood. Also, the cover rings 74 may have any desired cross-sectional shape, e.g., round, square, or semi-circular.

The foregoing represent preferred embodiments of the invention. Variations and modifications will be apparent to persons skilled in the art, without departing from the inventive concepts disclosed herein. For example, in the embodiment shown in FIGS. 9-10, instead of having a cover ring 74 that extends completely around the head portion of the racquet, a plurality of curved ring segments may be used. For example, the racquet may have ring segments that cover only portions of the frame having port holes (e.g., that cover the upper and lower surfaces of the sides, tip, and throat bridge). In the portions of the racquet having conventional string holes, no ring covering would be provided. Or, ring segments can be provided to cover only part of the frame regions containing port holes, e.g., covering only the tip and throat bridge regions, or covering only the sides. All such modifications and variations are intended to be within the scope of the invention, as defined in the following claims.

The invention claimed is:

1. A process for forming at least a portion of a sports racquet frame having at least one string port hole formed therein, said frame having a string bed plane, comprising the steps of: (a) providing a prepreg tube containing an inflatable bladder therein; (b) placing said prepreg tube inside a mold which, when closed, forms a mold cavity in the desired shape of at least a portion of said frame, said mold cavity containing at least one mold member sized and oriented to mold a string port hole having a first open end, a second open end and at least one side extending between the first and second open ends through the frame in said string bed plane, said mold member extending across said mold cavity from an upper or lower mold cavity wall, said at least one side of the string port hole opposing an open side in a direction perpendicular to said string bed plane with a pair of opposing flat string contacting walls extending between the at least one side of the string port hole and the opposing open side, wherein each of the pair of opposing flat string contacting walls includes an inner edge and an outer edge with a guide lip in the outer edge of each of the pair of opposing flat string contacting walls; (c) pressurizing said bladder so that said prepreg tube conforms to the shape of the mold and said mold member; and (d) heating said mold such that said prepreg tube cures.

2. A method according to claim 1, further comprising the step of securing a cover member over the open side of said string port hole such that said hole is open through the frame only in said string bed plane.

3. A method according to claim 2, wherein said mold cavity contains a plurality of mold members for forming a plurality of string port holes.

4. A method according to claim 3, comprising the step of forming a plurality of adjacent string hole ports which are open along one side alternately in opposite directions, wherein said mold members extend alternately from an upper and lower mold cavity wall.

5. A method according to claim 4, wherein the frame includes a head portion having upper and lower surfaces in a direction perpendicular to said string bed plane, comprising the step of securing a pair of cover plates over the upper and lower surfaces to cover the open sides of the string port holes.

6. A process according to claim 1, wherein said mold includes a head forming portion, a shaft forming portion, and a handle forming portion, and wherein a single prepreg tube is placed in said head, shaft, and handle forming portions.

7. A method according to claim 1, wherein said mold cavity contains a plurality of mold members for forming a plurality of string port holes.

* * * * *